US011520938B2

(12) United States Patent
Yu et al.

(10) Patent No.: US 11,520,938 B2
(45) Date of Patent: Dec. 6, 2022

(54) ROOT LEVEL CONTROLS TO ENABLE PRIVACY MODE FOR DEVICE CAMERAS (71) Applicant: Lenovo (Singapore) Pte. Ltd., Singapore (SG)

(72) Inventors: Jonathan Jen-Wei Yu, Raleigh, NC (US); Jonathan Co Lee, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 465 days.

(21) Appl. No.: 16/700,193

(22) Filed: Dec. 2, 2019

(65) Prior Publication Data
US 2021/0165917 A1 Jun. 3, 2021

(51) Int. Cl.
*G06F 21/84* (2013.01)
*H04N 5/225* (2006.01)
*H04N 5/232* (2006.01)

(52) U.S. Cl.
CPC .......... *G06F 21/84* (2013.01); *H04N 5/2252* (2013.01); *H04N 5/232* (2013.01)

(58) Field of Classification Search
CPC ...... G06F 21/6245; G06F 21/83; G06F 21/84; H04N 5/2252; H04N 5/232; H04N 5/23206; H04N 5/23225; H04N 5/23245
See application file for complete search history.

(56) References Cited

U.S. PATENT DOCUMENTS

| 8,194,174 | B2* | 6/2012 | Roskowski | H04N 5/23206 348/346 |
| 9,654,288 | B1* | 5/2017 | Howell | H04L 9/14 |
| 2014/0283135 | A1* | 9/2014 | Shepherd | G06F 21/6218 726/29 |
| 2016/0105598 | A1* | 4/2016 | Zeira | H04N 5/2252 348/143 |
| 2017/0203446 | A1* | 7/2017 | Dooley | H04N 5/23206 |
| 2018/0103206 | A1* | 4/2018 | Olson | H04N 5/23267 |
| 2019/0222749 | A1* | 7/2019 | Paulus | H04N 1/00461 |
| 2020/0334929 | A1* | 10/2020 | Jeong | G06F 21/6245 |

* cited by examiner

*Primary Examiner* — Amy R Hsu
(74) *Attorney, Agent, or Firm* — VanLeeuwen & VanLeeuwen; Kanta Shimotaka (57) ABSTRACT An approach is provided that detects when a digital camera has been set to a privacy mode that limits access to the digital camera. When in privacy mode, the digital camera receives a request to access the digital camera from an application. The approach determines whether the requesting application is allowed access to the digital camera while the digital camera is in the privacy mode. The requesting application is then allowed access to the digital camera in response to the determination being that the requesting application is allowed access to the digital camera. Likewise, the requesting application is inhibited access to the digital camera in response to the determination being that the requesting application is not allowed access to the digital camera.

20 Claims, 7 Drawing Sheets

ROOT LEVEL CONTROLS TO ENABLE PRIVACY MODE FOR DEVICE CAMERAS

BACKGROUND

Security and privacy concerns over attached cameras (embedded in computing devices or separate devices) are becoming an increased security concern, especially with new technology such as computer vision, people counting, and public camera recordings. As the adoption and proliferation of cheaper camera technology grows, so do organizations that use them. This may result in new and immature companies that provide digital camera support without a back-end security infrastructure to protect consumers. This oversight leads to more risks of hacking, breaches, and misuse. As augmented reality filters and AR apps such as virtual makeup, clothing, or product experiences become more available and hacking of cameras become more of an issue, controlling use of a digital camera is increasingly important.

SUMMARY

An approach is provided that detects when a digital camera has been set to a privacy mode that limits access to the digital camera. When in privacy mode, the digital camera receives a request to access the digital camera from an application. The approach determines whether the requesting application is allowed access to the digital camera while the digital camera is in the privacy mode. The requesting application is then allowed access to the digital camera in response to the determination being that the requesting application is allowed access to the digital camera. Likewise, the requesting application is inhibited access to the digital camera in response to the determination being that the requesting application is not allowed access to the digital camera.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages will become apparent in the non-limiting detailed description set forth below.

BRIEF DESCRIPTION OF THE DRAWINGS

This disclosure may be better understood by referencing the accompanying drawings, wherein.

DETAILED DESCRIPTION

The figures show an approach that provides root-level hardware and software controls on a digital camera to protect the camera's user from unwanted and unauthorized control of the camera by hackers and other malevolent users. The approach prevents apps from accessing camera data. The approach provides specific camera settings that trigger an entirely separate wired architecture, either provided in software or hardware, that disconnects the camera from software applications entirely and ensures that the camera cannot be shared outside the local attached display.

The following detailed description will generally follow the summary, as set forth above, further explaining and expanding the definitions of the various aspects and embodiments as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Figure 1:
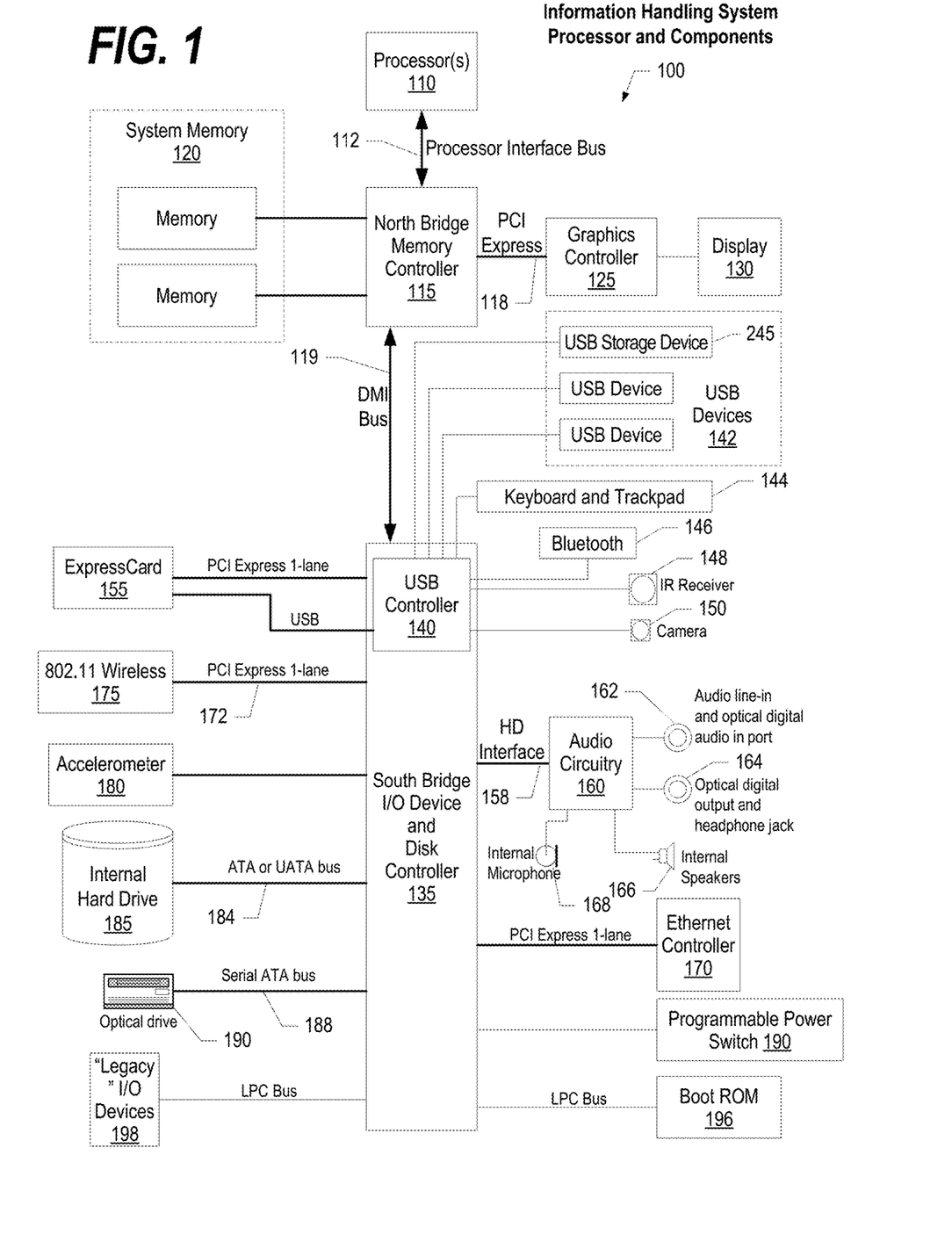
FIG. 1 is a block diagram of a data processing system in which the methods described herein can be implemented.
Figure 2:
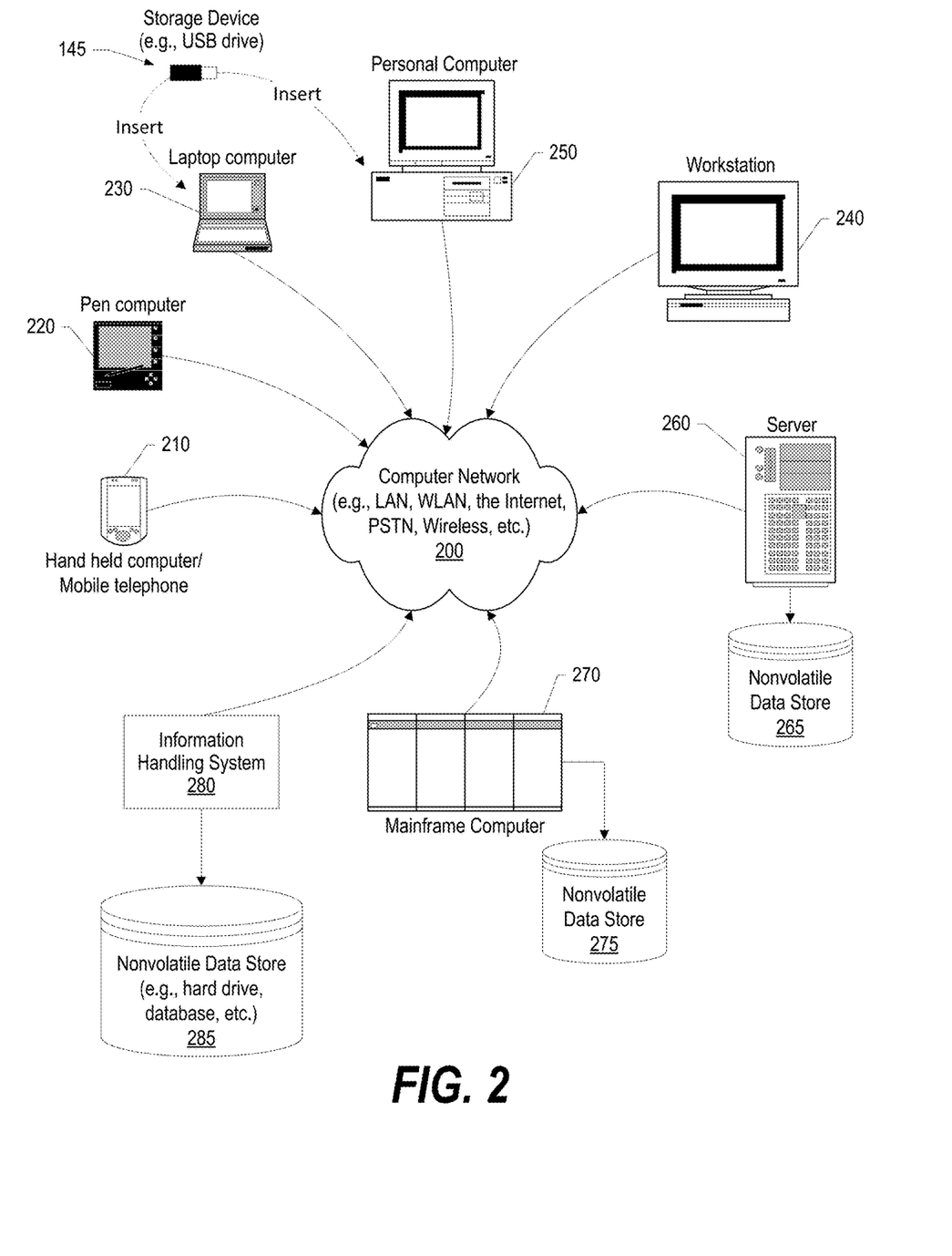
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a device that is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Accelerometer 180 connects to Southbridge 135 and measures the acceleration, or movement, of the device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may be a device that can take many forms. For example, an information handling system may take the form of a desktop device, server device, portable device, laptop device, notebook device, or other form factor device. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of devices that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling system devices include pen, or tablet, device 220, laptop, or notebook, device 230, workstation device 240, personal computer system device 250, and server device 260. Other types of information handling system devices that are not individually shown in FIG. 2 are represented by information handling system device 280. As shown, the various information handling system devices can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
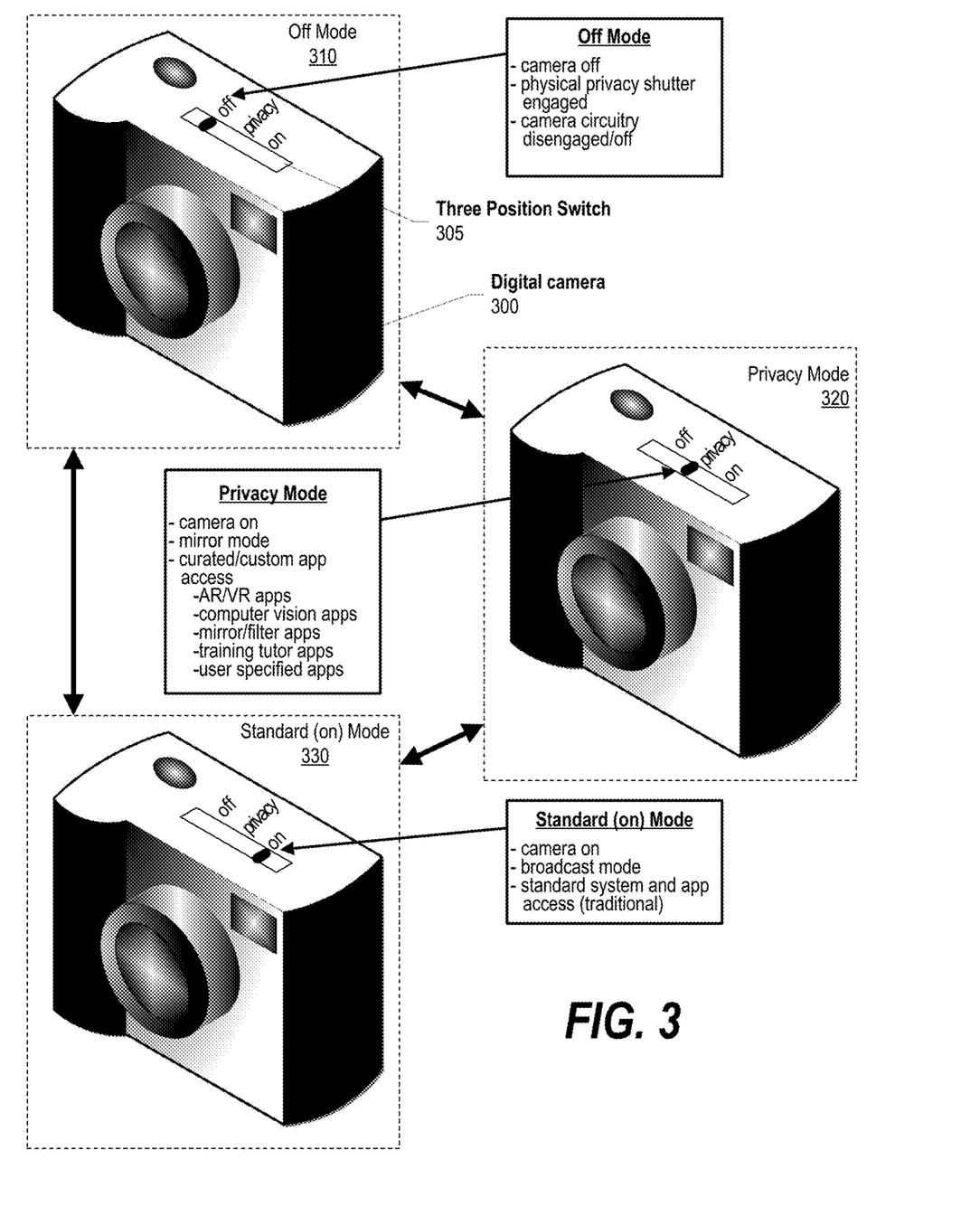
FIG. 3 is a diagram depicting a digital camera with a usage limitation switch that is user operated to switch the camera into either fully on mode, fully off mode, and privacy mode.

FIG. 3 is a diagram depicting a digital camera with a usage limitation switch that is user operated to switch the camera into either fully on mode, fully off mode, and privacy mode. FIG. 3 shows digital camera 300 with three position physical control that can be placed in one of three positions. Off mode 310 shows the physical control being in the "off" position where the camera is physically powered off and, in one embodiment, a physical privacy shutter is engaged covering the camera lens so that the camera is unable to take any digital images. If the camera is part of a larger information handling system, such as embedded in a laptop, smart phone, tablet, or the like, then it might also have a switch in the circuitry that is disengaged cutting access and power to the camera circuitry from the rest of the device.

Privacy mode 320 is depicted as the middle position on the device marked "privacy." While in privacy mode, the camera has power to the camera circuitry and any physical privacy shutter is disengaged. However, while in privacy mode, only certain applications, or "apps," have access to the camera functionality. For example, a camera app on a smart phone might have access to the camera functionality, but a social media app on the smart phone might not have access to the camera functionality.

Finally, standard, or "ON," mode 330 is the setting to place the camera in a less secure mode that is standard on traditional digital camera. While in standard mode, the camera is on and is in broadcast mode so that images can be broadcast to other devices (wirelessly, etc.), and standard system and application access is provided to the camera functionality.

Figure 4:
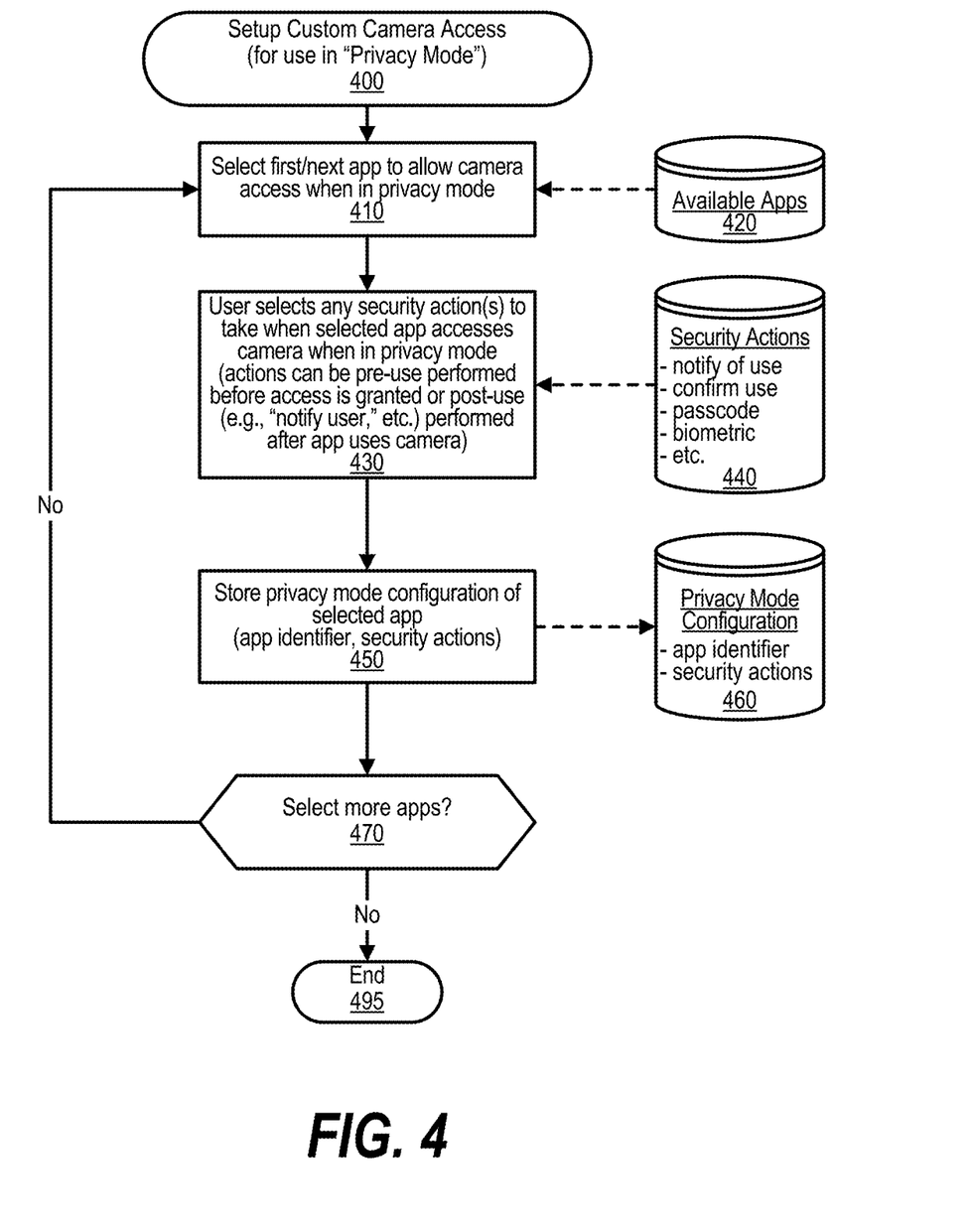
FIG. 4 is a flowchart showing steps taken by a process sets up app usage by a digital camera when the camera is in a privacy mode.

FIG. 4 is a flowchart showing steps taken by a process sets up app usage by a digital camera when the camera is in a privacy mode. FIG. 4 processing commences at 400 and shows the steps taken by a process that sets up custom camera access to applications ("apps") to use the digital camera functionality while the camera is set in "Privacy Mode." At step 410, the process selects the first app to allow camera access when the camera is set in privacy mode. The list of available applications, or apps, is retrieved from data store 420 and might be provided by an operating system that executes the apps and the digital camera functionality.

At step 430, the process chooses any security action that is to be taken when the selected app accesses the digital camera while the camera is in privacy mode. The actions can be pre-use actions that are performed before access to the camera is granted, or post-use actions, such as notifying the user, etc., that are performed after the app uses the digital camera while in privacy mode. For example, the user might choose no security actions when the devices "camera" app is being used and the digital camera is in security mode, but may choose to require entry of a code when a social media app requests access to the digital camera when the camera is set in privacy mode. At step 450, the process stores the privacy mode configuration of the selected app (e.g., app identifier, security actions, etc.) in data store 460.

The process determines whether the user wishes to select more apps that are allowed access to the camera while in privacy mode (decision 470). If the user wishes to select more apps that are allowed access to the camera while in privacy mode, then decision 470 branches to the 'yes' branch which loops back to step 410 to receive the user's next app selection and process the selection as described above. This looping continues until the user does not wish to select any additional apps to allow access to the camera while in privacy mode, at which point decision 470 branches to the 'no' branch exiting the loop. FIG. 4 processing thereafter ends at 495.

Figure 5:
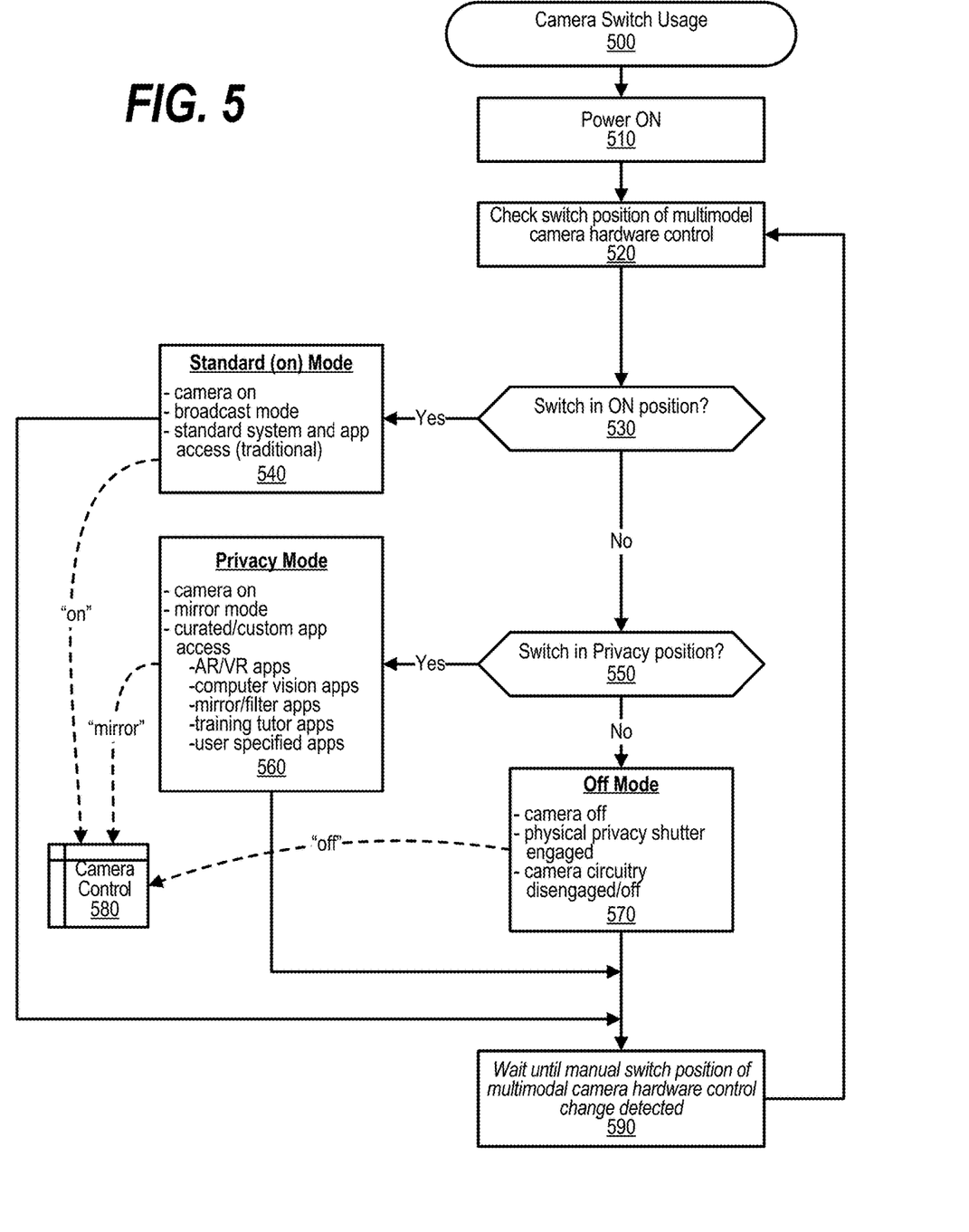
FIG. 5 is a flowchart showing steps taken by a process that shows usage of a digital camera operable from three usage modes.

FIG. 5 is a flowchart showing steps taken by a process that shows usage of a digital camera operable from three usage modes. FIG. 5 processing commences at 500 and shows the steps taken by a process that sets a digital camera's security based on a physical privacy control located on the camera. In one embodiment, as shown in FIG. 3, the camera has a three-position switch to set the camera into either a "standard," (ON) position, a privacy position, or an OFF position. At step 510, the process detects that the device is powered ON. The device may be a larger information handling system, such as a tablet or smart phone, that has an integrated digital camera and a physical switch to set the camera into one of the three modes.

At step 520, the process checks the switch position of the camera hardware control, such as the three-position switch shown in FIG. 3. The process determines as to whether the physical switch is in the ON position (decision 530). If the physical switch is in the ON position, then decision 530 branches to the 'yes' branch whereupon, at step 540 the process sets the camera into the standard (on) mode where the camera circuitry is powered on, the camera allows broadcast mode, and standard system and application access is provided to the digital camera, such as with traditional digital cameras. The ON mode of the digital camera is stored in memory area 580. On the other hand, if the physical switch is not in the ON position, then decision 530 branches to the 'no' branch for further processing.

The process determines as to whether the switch is in the Privacy position (decision 550). If the switch is in the Privacy position, then decision 550 branches to the 'yes' branch whereupon, at step 560, the camera is powered on and set into a mirror mode where only selected applications can access the digital camera. For example, the user may select that ARNR apps, computer vision apps, mirror/filter apps, training tutor apps, and other user specified apps can access the digital camera as shown in FIG. 4 with other applications being denied access to the digital camera when the camera is in the Privacy position. The privacy mode of the digital camera is stored in memory area 580.

On the other hand, if the switch is not in the Privacy position, then decision 550 branches to the 'no' branch whereupon, at step 570, the process enters the OFF mode of the digital camera where the camera is powered off, a physical privacy shutter is engaged over the lens, and the camera circuitry is disengaged and or switched off. The OFF mode of the digital camera is stored in memory area 580.

At step 590, the process waits until it detects that the user has moved the manual switch position of multimodal camera hardware control to a different position, at which processing loops back to step 520 to check the new switch position and set the digital camera's mode as described above.

Figure 6:
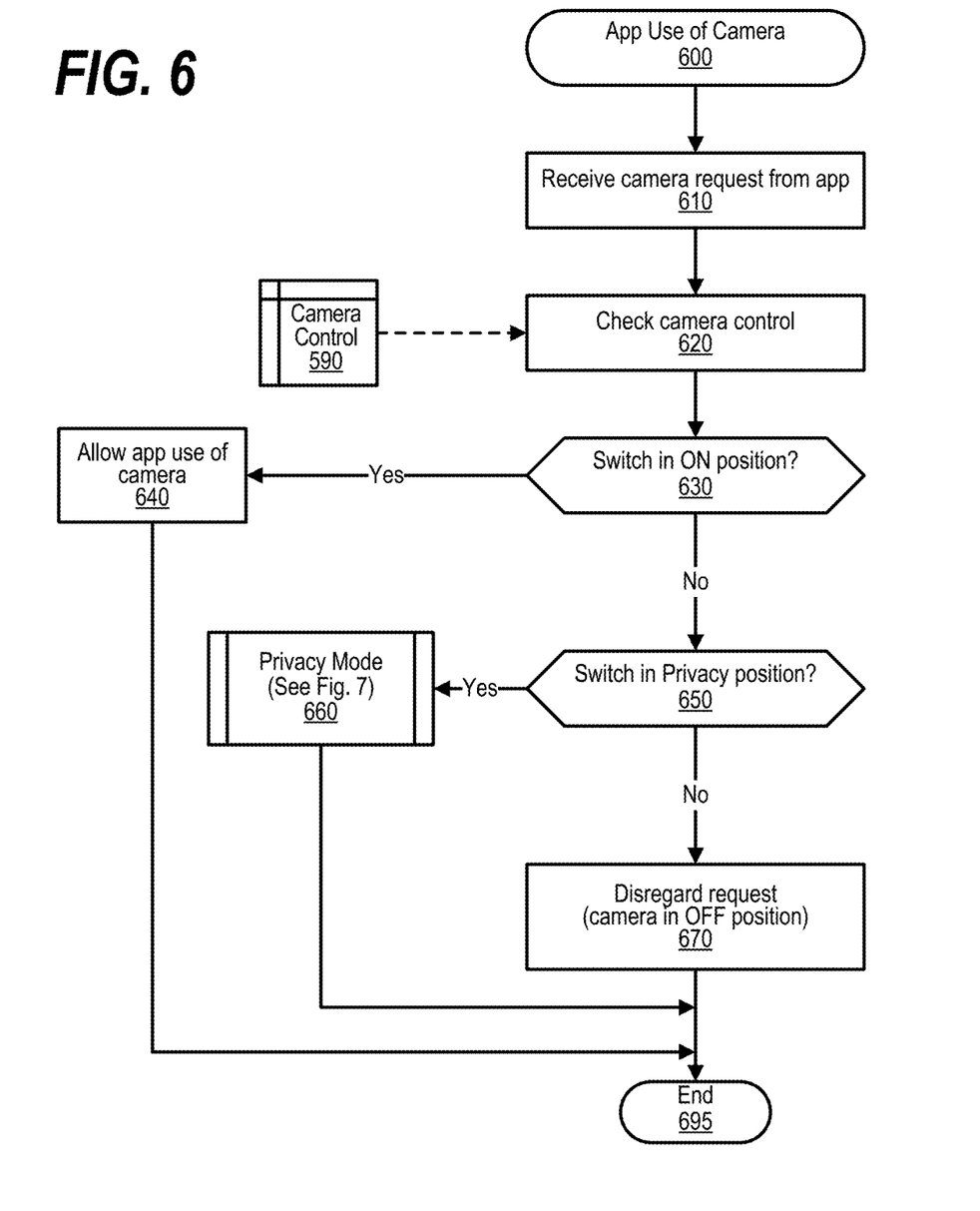
FIG. 6 is a flowchart showing steps taken that show an app's use of a digital camera based on the camera's current usage limitation setting.

FIG. 6 is a flowchart showing steps taken that show an app's use of a digital camera based on the camera's current usage limitation setting. FIG. 6 processing commences at 600 and shows the steps taken by a process that handles an application's (app) request to access and use a digital camera. At step 610, the process receives a camera request from an application.

At step 620, the process checks camera control setting stored in memory area 590 that indicates the access level that has been set by the user of the device, such as a digital camera, a smart phone with a digital camera, a tablet with a digital camera, or other such device that has a digital camera. The process determines as to whether the camera access switch is in the ON position (decision 630). If the camera access switch is in the ON position, indicating that traditional (non-regulated) use of the camera is permitted, then decision 630 branches to the 'yes' branch whereupon, at step 640, the process allows the application's access and use of the digital camera. On the other hand, if the camera access switch is not in the ON position, then decision 630 branches to the 'no' branch for further processing.

The process next determines as to whether the camera access switch is in the Privacy position (decision 650). If the camera access switch is in the Privacy position, then decision 650 branches to the 'yes' branch whereupon, at predefined process 660, the process performs the Privacy Mode routine to determine whether this application is permitted access and use of the digital camera (see FIG. 7 and corresponding text for processing details). On the other hand, if the camera access switch is not in the Privacy position, then decision 650 branches to the 'no' branch whereupon, at step 670, the process disregards the application request because the camera access switch is evidently in the OFF position prohibiting use of the digital camera. FIG. 6 processing thereafter ends at 695.

Figure 7:
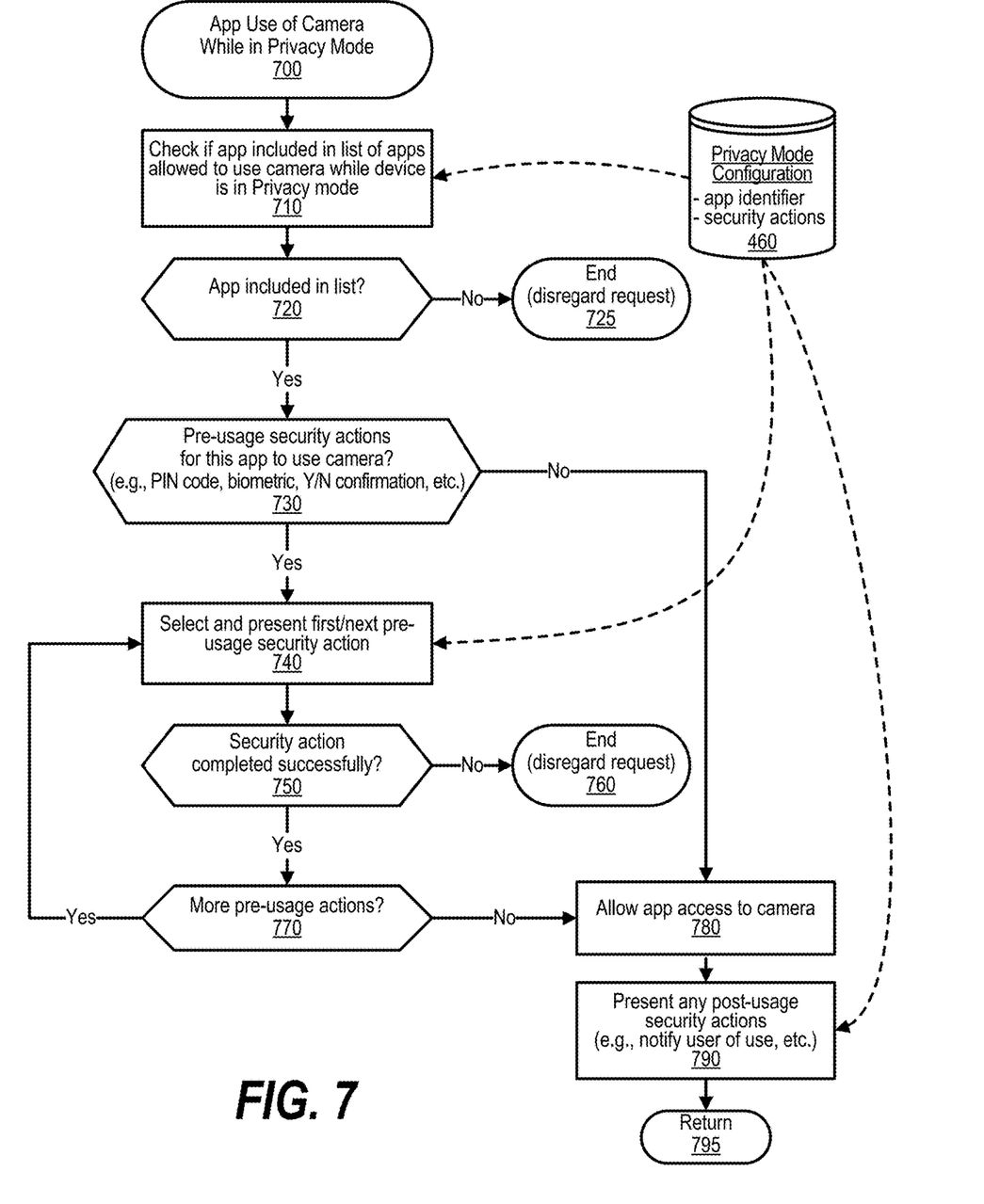
FIG. 7 is a flowchart showing steps taken by an app utilizing a digital camera when the camera is set to a privacy mode.

FIG. 7 is a flowchart showing steps taken by an app utilizing a digital camera when the camera is set to a privacy mode. FIG. 7 processing commences at 700 and shows the steps taken by a process that handles an application's (app) use of a digital camera when the access control setting of the camera is set to Privacy mode. At step 710, the process checks data store 460 to see if the requesting application is included in the list of applications that are allowed to use the digital camera while the device is in Privacy mode. Data store 460 has the application identifier (e.g., executable name, etc.) as well as any security actions that are to be performed when the application accesses the camera when the device is set to Privacy mode.

The process determines as to whether the requesting application is included in list of applications that can access and use the digital camera while the device is in the Privacy mode (decision 720). If the requesting application is included in list of applications that can access and use the digital camera while the device is in the Privacy mode, then decision 720 branches to the 'yes' branch for further processing. On the other hand, if the requesting application is not included in the list (indicating that the requesting application is not allowed access to the digital camera while in Privacy mode), then decision 720 branches to the 'no' branch and processing ends at 725 with the process disregarding the application's request to access the digital camera.

The process determines as to whether there are any pre-usage security actions noted this application in order for the requesting application to be able to use the digital camera while the device is set to Privacy mode (decision 730). If there are any pre-usage security actions for this application to use the digital camera, then decision 730 branches to the 'yes' branch to perform steps 740 through 770. On the other hand, if there are not any pre-usage security actions for this application to use the digital camera, then decision 730 branches to the 'no' branch bypassing steps 740 through 770.

For any pre-usage security actions, steps 740 through 770 are performed. At step 740, the process selects and presents the first pre-usage security action, such as receiving a biometric (fingerprint, etc.) from the user, receiving a code from the user, receiving a confirmation (e.g., "allow yes/no?", etc.). The process determines as to whether the selected security action was completed successfully (decision 750). If the selected security action was completed successfully, then decision 750 branches to the 'yes' branch for further processing. On the other hand, if the selected security action was not completed successfully (e.g., expected biometric input not provided, expected code not entered, "no" response provided to confirmation, etc.), then decision 750 branches to the 'no' branch and processing ends at 760 with the process disregarding the camera access/usage request from the requesting application. The process determines as to whether there are any more pre-usage security actions to select and perform (decision 770). If there are more pre-usage security actions to select and perform, then decision 770 branches to the 'yes' branch which loops back to step 740 to select and perform the next pre-usage security action as described above. This looping continues until all of the pre-usage security actions have been completed successfully, at which point decision 770 branches to the 'no' branch exiting the loop.

If there were no pre-usage security actions (with decision 730 branching to the 'no' branch) or all of the pre-usage security actions were performed successfully (with decision 770 branching to the 'no' branch), then, at step 780, the process allows the application to access and/or use the digital camera. At step 790, the process presents any post-usage security actions, such as notifying the user that the digital camera was accessed by a particular application. FIG. 7 processing thereafter returns to the calling routine (see FIG. 6) at 795.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The detailed description has been presented for purposes of illustration, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. As used herein, a computer readable storage medium does not include a transitory signal.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While particular embodiments have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to others containing only one such element, even when the same claim includes the introductory phrases "one or more" or "at least one" and indefinite articles such as "a" or "an"; the same holds true for the use in the claims of definite articles.

What is claimed is:

1. A method, implemented by an information handling system comprising a processor, a memory accessible by the processor, a digital camera accessible by the processor, and a network interface connecting the information handling system to a computer network, the method comprising:
   detecting that a digital camera has been set to a privacy mode that limits access to an image capture function of the digital camera;
   receiving a request to access the digital camera from an application;
   determining whether the requesting application is allowed access to the digital camera while the digital camera is in the privacy mode;
   allowing access by the requesting application to the image capture function of the digital camera in response to the determination being that the requesting application is allowed access to the digital camera; and
   inhibiting access by the requesting application to the image capture function of the digital camera in response to the determination being that the requesting application is disallowed access to the digital camera.

2. The method of claim 1 wherein the detection that the digital camera has been set to the privacy mode further comprises:
   detecting a physical control on the digital camera has been placed in a privacy mode position.

3. The method of claim 2 wherein a set of positions on the digital camera include an ON mode position that allows general access to the digital camera from a plurality of applications, an OFF mode position that inhibits access to the digital camera from any application, and the privacy mode position.

4. The method of claim 1 wherein, in response to allowing access by the requesting application, the method further comprises:
   identifying a security action based on the application accessing the digital camera while the digital camera is in the privacy mode; and
   performing the identified security action.

5. The method of claim 4 wherein the security action is selected from the group consisting of entry of a code by a user, entry of biometric data from the user, and a confirmation from a user, and wherein the method further comprises:
   authenticating the security action, wherein the allowing of access by the requesting application is inhibited in response to an unsuccessful authentication of the security action.

6. The method of claim 1 further comprising:
   prior to receiving the request:
      receiving a user selection of one or more applications that are allowed to use the digital camera while the camera is in the privacy mode; and
      storing an application identifier corresponding to each of the one or more applications in a nonvolatile memory area; and
   wherein the determining further comprises:
      receiving a requesting application identifier corresponding to the requesting application; and
      searching the nonvolatile memory area for the requesting application identifier, wherein the allowing is performed in response to the searching identifying the requesting application identifier in the nonvolatile memory area, and wherein the inhibiting is performed in response to an absence of the requesting application identifier in the nonvolatile memory area.

7. The method of claim 6 further comprising:
prior to receiving the request:
receiving a selection of a security action corresponding to a selected one of the one or more applications, wherein the security action is performed when the selected application requests access to the digital camera while the digital camera is the privacy mode.

8. An information handling system comprising:
one or more processors;
a memory coupled to at least one of the processors;
a digital camera accessible by at least one of the processors;
a network interface that connects the information handling system to a computer network; and
a set of computer program instructions stored in the memory and executed by at least one of the processors in order to perform actions comprising:
detecting that a digital camera has been set to a privacy mode that limits access to an image capture function of the digital camera;
receiving a request to access the digital camera from an application;
determining whether the requesting application is allowed access to the digital camera while the digital camera is in the privacy mode;
allowing access by the requesting application to the image capture function of the digital camera in response to the determination being that the requesting application is allowed access to the digital camera; and
inhibiting access by the requesting application to the image capture function of the digital camera in response to the determination being that the requesting application is disallowed access to the digital camera.

9. The information handling system of claim 8 wherein the detection that the digital camera has been set to the privacy mode further comprises:
detecting a physical control on the digital camera has been placed in a privacy mode position.

10. The information handling system of claim 9 wherein a set of positions on the digital camera include an ON mode position that allows general access to the digital camera from a plurality of applications, an OFF mode position that inhibits access to the digital camera from any application, and the privacy mode position.

11. The information handling system of claim 8 wherein, in response to allowing access by the requesting application, wherein the actions further comprise:
identifying a security action based on the application accessing the digital camera while the digital camera is in the privacy mode; and
performing the identified security action.

12. The information handling system of claim 11 wherein the security action is selected from the group consisting of entry of a code by a user, entry of biometric data from the user, and a confirmation from a user, and wherein the actions further comprise:
authenticating the security action, wherein the allowing of access by the requesting application is inhibited in response to an unsuccessful authentication of the security action.

13. The information handling system of claim 8 wherein the actions further comprise:
prior to receiving the request:
receiving a user selection of one or more applications that are allowed to use the digital camera while the camera is in the privacy mode; and
storing an application identifier corresponding to each of the one or more applications in a nonvolatile memory area; and
wherein the determining further comprises:
receiving a requesting application identifier corresponding to the requesting application; and
searching the nonvolatile memory area for the requesting application identifier, wherein the allowing is performed in response to the searching identifying the requesting application identifier in the nonvolatile memory area, and wherein the inhibiting is performed in response to an absence of the requesting application identifier in the nonvolatile memory area.

14. The information handling system of claim 13 wherein the actions further comprise:
prior to receiving the request:
receiving a selection of a security action corresponding to a selected one of the one or more applications, wherein the security action is performed when the selected application requests access to the digital camera while the digital camera is the privacy mode.

15. A computer program product comprising:
a computer readable storage medium, comprising computer program code that, when executed by an information handling system, executes actions comprising:
detecting that a digital camera has been set to a privacy mode that limits access to an image capture function of the digital camera;
receiving a request to access the digital camera from an application;
determining whether the requesting application is allowed access to the digital camera while the digital camera is in the privacy mode;
allowing access by the requesting application to the image capture function of the digital camera in response to the determination being that the requesting application is allowed access to the digital camera; and
inhibiting access by the requesting application to the image capture function of the digital camera in response to the determination being that the requesting application is disallowed access to the digital camera.

16. The computer program product of claim 15 wherein the detection that the digital camera has been set to the privacy mode further comprises:
detecting a physical control on the digital camera has been placed in a privacy mode position.

17. The computer program product of claim 16 wherein a set of positions on the digital camera include an ON mode position that allows general access to the digital camera from a plurality of applications, an OFF mode position that inhibits access to the digital camera from any application, and the privacy mode position.

18. The computer program product of claim 15 wherein, in response to allowing access by the requesting application, wherein the actions further comprise:
identifying a security action based on the application accessing the digital camera while the digital camera is in the privacy mode; and
performing the identified security action.

19. The computer program product of claim 18 wherein the security action is selected from the group consisting of entry of a code by a user, entry of biometric data from the user, and a confirmation from a user, and wherein the actions further comprise:

authenticating the security action, wherein the allowing of access by the requesting application is inhibited in response to an unsuccessful authentication of the security action.

20. The computer program product of claim 15 wherein the actions further comprise:

prior to receiving the request:

receiving a user selection of one or more applications that are allowed to use the digital camera while the camera is in the privacy mode; and         storing an application identifier corresponding to each of the one or more applications in a nonvolatile memory area; and     wherein the determining further comprises:

receiving a requesting application identifier corresponding to the requesting application; and         searching the nonvolatile memory area for the requesting application identifier, wherein the allowing is performed in response to the searching identifying the requesting application identifier in the nonvolatile memory area, and wherein the inhibiting is performed in response to an absence of the requesting application identifier in the nonvolatile memory area.

\* \* \* \* \*